United States Patent [19]

Youness

[11] 4,170,946

[45] Oct. 16, 1979

[54] PLASTIC SWINGBOARD BRACING PANEL

[76] Inventor: Michael R. Youness, 615 Canyon, Rochester, Mich. 48063

[21] Appl. No.: 838,090

[22] Filed: Sep. 30, 1977

[51] Int. Cl.$^2$ ............... B60P 7/06; B60P 7/14; B61D 45/00; B61D 49/00

[52] U.S. Cl. .................. 105/493; 105/376; 105/497

[58] Field of Search ........... 156/499; 105/376, 466, 105/467, 474, 486, 487, 488, 489, 490, 493, 494, 496, 497, 498, 502, 503

[56] References Cited

U.S. PATENT DOCUMENTS

| | | | |
|---|---|---|---|
| 642,058 | 1/1900 | Worswick | 105/493 |
| 1,637,748 | 8/1927 | Harmon | 105/493 |
| 2,629,338 | 2/1953 | Koch | 105/376 |
| 3,115,102 | 12/1963 | Rolfe, Jr. et al. | 105/493 |
| 3,554,136 | 1/1971 | Falk | 105/493 |
| 3,680,491 | 8/1972 | Chapman et al. | 105/493 |
| 3,783,078 | 1/1974 | Brodhead | 156/499 |
| 3,900,116 | 8/1975 | Gehri | 105/489 |

FOREIGN PATENT DOCUMENTS 826431 11/1969 Canada ................. 105/376

*Primary Examiner*—Albert J. Makay
*Assistant Examiner*—Howard Beltran
*Attorney, Agent, or Firm*—Basile and Weintraub

[57] ABSTRACT

A freight retaining device adapted to be positioned between opposite, vertical walls of a freight containing compartment, such as a railroad freight car. The device is in the form of a swingboard fabricated from a pair of plastic sheets each having a plurality of longitudinally disposed and laterally spaced ribs separated by integral webs. The sheets are joined in an abutting relationship such that the ribs project outwardly on opposite sides of the joined sheets while the sheet outer edges are fused to define a unitary member. The opposite, longitudinal ends of the unitary member are provided with means for releasably engaging supporting rails carried by the opposite, vertical walls of the freight containing compartment.

1 Claim, 6 Drawing Figures

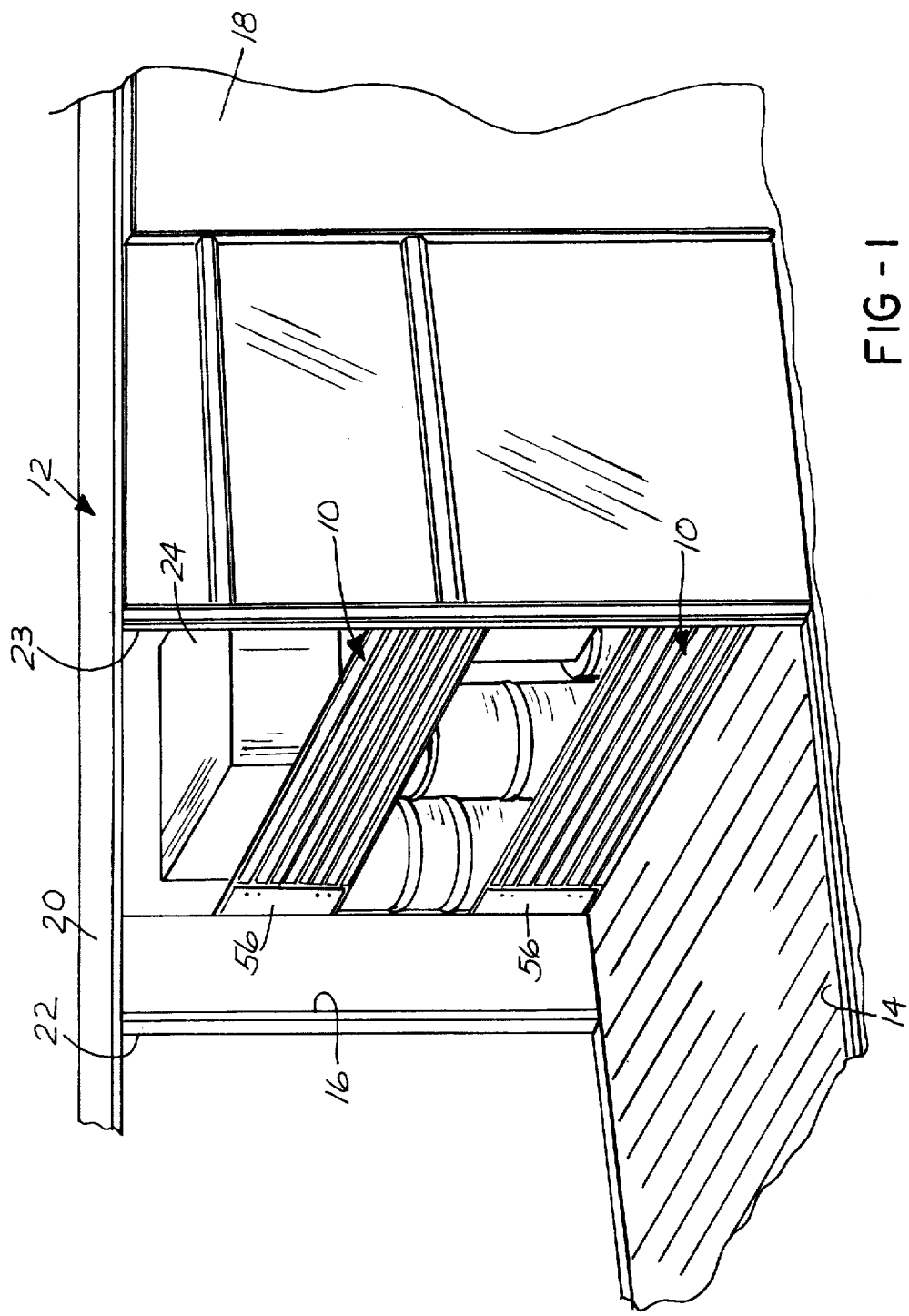

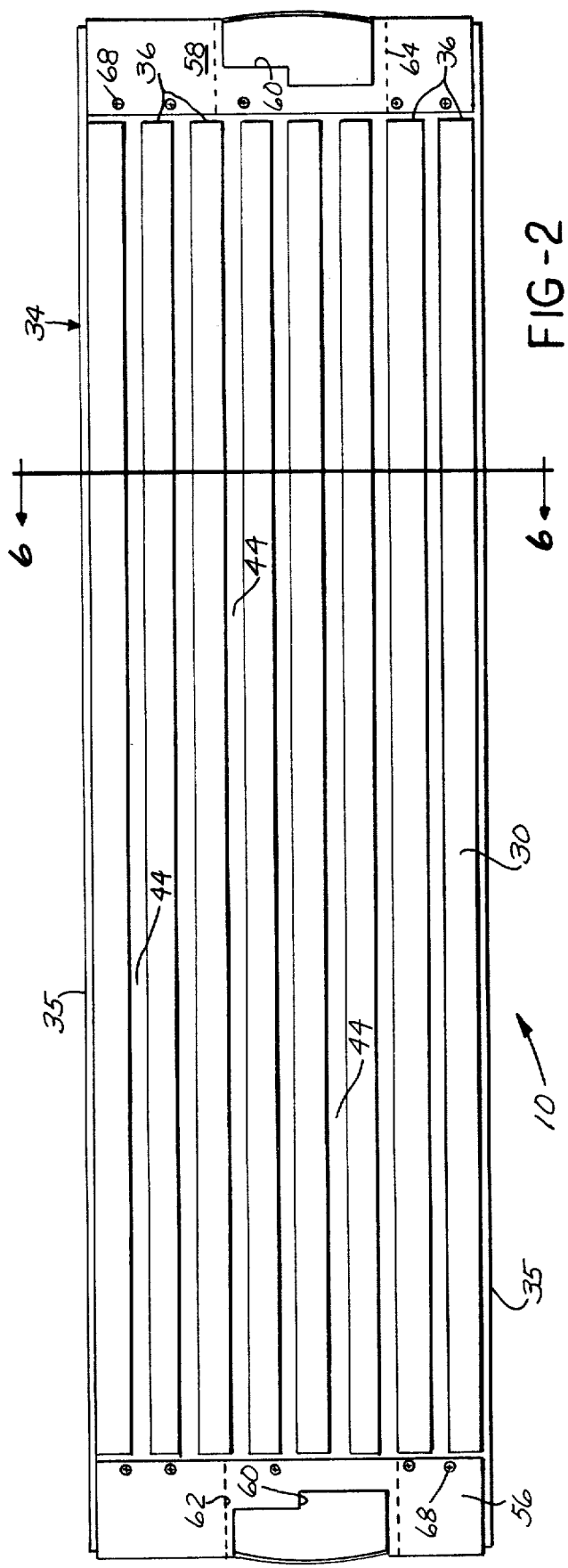
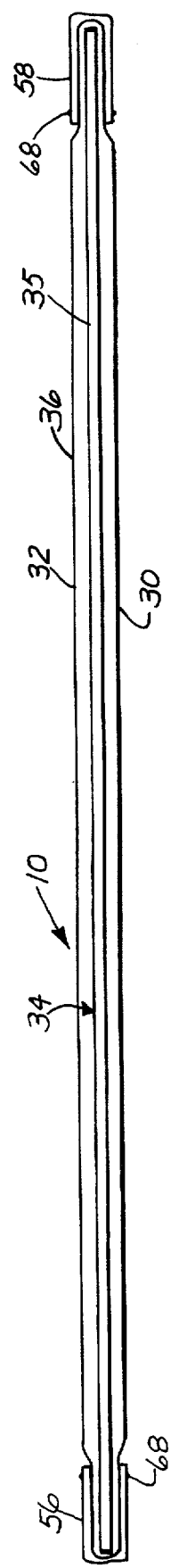

PLASTIC SWINGBOARD BRACING PANEL

BACKGROUND OF THE INVENTION

I. Field of the Invention

The present invention relates to freight bracing apparatus and, more particularly, to a new and improved freight bracing element known in the trade as a swingboard and to a new and novel method of manufacturing such a swingboard.

II. Description of the Prior Art

Freight bracing apparatus to which the present invention relates may be used in any freight storage chamber and is particularly adapted for use in portable chambers such as, for example, as provided by trucks and railway freight cars in which the freight must be secured in place so as to resist the shock loads which occur during the starting and stopping of such vehicles. Examples of prior art structures disclose one type of freight bracing apparatus which holds freight in place by having a crossbar including an elongated body having end fittings at opposite ends thereof which may be selectively secured at desired points to belt rails secured to the side walls of a boxcar. Other examples of known prior art swingboards are disclosed in U.S. Pat. No. 642,058; No. 1,637,748; No. 3,115,102; No. 3,680,491; and No. 3,554,136.

The aforementioned patents are relevant to the present invention in that they relate to various structures which are illustrative of swingboards known to the applicant.

III. Prior Art Statement

In the opinion of the applicant the above-mentioned United States patents represent the closest prior art of which the applicant is aware.

CROSS REFERENCE TO RELATED PATENTS

The present invention relates to U.S. Pat. No. 3,783,078 for a Method and Apparatus for Forming Hollow Plastic Articles, and said patent is incorporated herein by reference.

SUMMARY OF THE INVENTION

The present invention, which will be described subsequently in greater detail, comprises a swingboard particularly adapted as a freight bracing apparatus for freight compartments or the like, such as in trucks or railroad freight cars, of the type that has supporting rails mounted on opposite side walls of the compartment for mounting the swingboard between the opposite side walls of the compartment. The swingboard, in accordance with the present invention, comprises a first sheet of plastic material that has a plurality of longitudinally disposed and laterally spaced ribs separated by integral webs. A second sheet of plastic material complementary to said first sheet has a plurality of longitudinally disposed and laterally spaced ribs which are similarly separated by integral webs. The two sheets are joined in an abutting relationship such that the ribs project outwardly on opposite sides of the joined sheets and the edges of the sheets abut and are fused to each other to define a unitary member. Means are carried at the opposite, longitudinal ends of the unitary member for releasably engaging the supporting rails carried by the opposing side walls of the freight compartment.

It is therefore a primary object of the present invention to provide a new and improved swingboard which is fabricated from a plastic material which is of a lightweight and durable construction.

It is a further object of the present invention to provide a new and improved swingboard of the type described herein which is simple in design, economical to manufacture, and reliable and efficient in operation.

Other objects, advantages and applications of the present invention will become apparent to those skilled in the art of swingboards when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view of a section of a freight compartment, such as a railroad freight car, incorporating a freight bracing apparatus in the form of a swingboard constructed in accordance with the principles of the present invention;

FIG. 2 is a rear elevational view of the swingboard illustrated in FIG. 1 of the drawings;

FIG. 3 is a top plan view of the swingboard illustrated in FIG. 2;

DESCRIPTION OF THE PREFERRED EMBODIMENT

Figure 4:
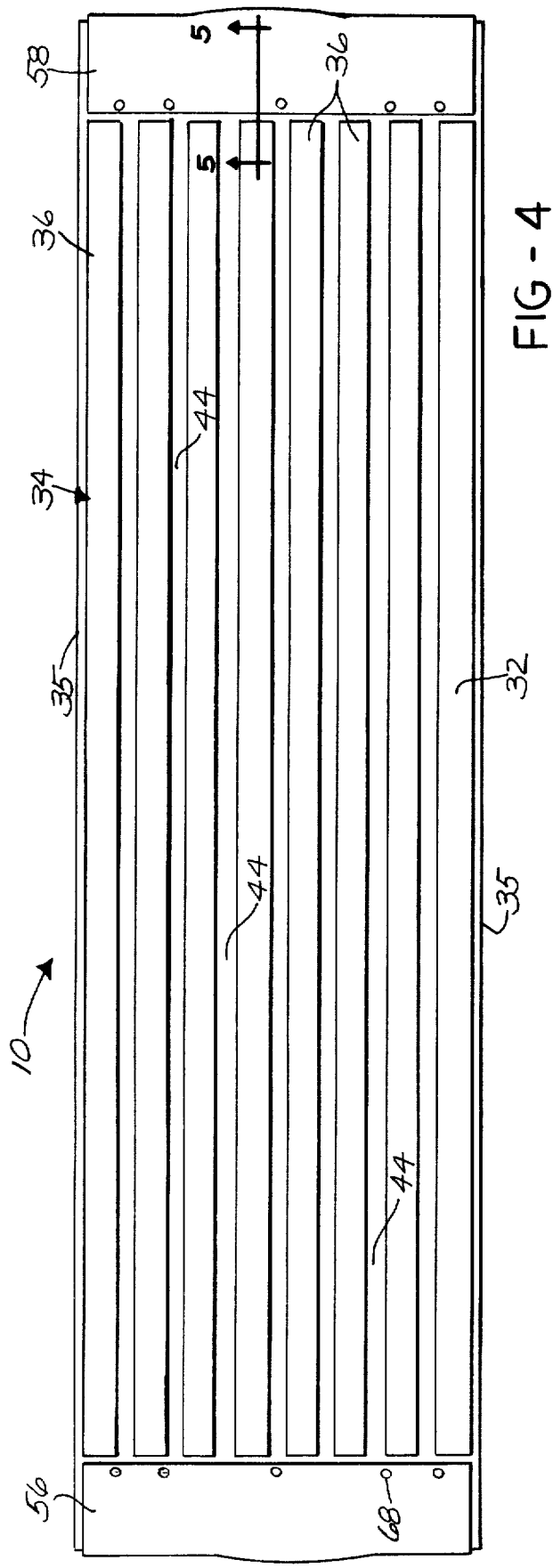
FIG. 4 is a front elevational view of the swingboard illustrated in FIGS. 1 through 3.

Referring now to the drawings and, in particular, to FIG. 1 wherein there is illustrated one example of the present invention in the form of a swingboard or bracing panel 10 mounted to the interior of a railroad freight car 12. It is to be understood that although the present invention is described in conjunction with the use of a railroad car 12, the freight bracing swingboard or bracing panel 10 and the inventive method for manufacturing the same may be employed in other cargo areas. The inventive swingboard or bracing panel 10, however, has particular advantage in the bracing of freight within a freight transporting vehicle, such as a railway car or highway truck. The railway car 12 is of the boxcar type and has floor 14, side wall 16, opposing side wall 18, roof 20, and end walls (not shown) that define the closed cargo area. A doorway opening 22 is formed in the side wall 16, and a like doorway opening 23 is further formed in the opposing side wall 18 to facilitate loading and unloading of the car 12 in the conventional manner. A plurality of parallel, horizontally disposed belt or supporting rails (not shown) are fixed to the side walls 16 and 18. The belt rails are of conventional design extending substantially the full length of the side walls 16 and 18 on either side of the doorway openings 22 and 23. The belt rails are fixed to the opposite side walls 16 and 18 at substantially the same distance from the floor 14 such that the side wall belt rails are the same distance from the floor on both opening walls 16 and 18. As will become more apparent as the description proceeds, the belt rails provide a means whereby the swingboard 10 may be detachably supported relative to the opposite side walls and extend across the width of the car 12 in a conventional manner. As is also conventional with swingboards, the swingboards present an enlarged freight engaging wall surface and are adapted to be positioned on the belt rails or comparable supports, such as disclosed in the aforementioned patents. The belt rails receive crossbars or locking members or the like placed to one side of the swingboard 10 to releasably hold the swingboard 10 in contact with the freight 24 which is desired to be retained in position.

Referring now to FIGS. 3 through 6 for an aid in the description of the inventive swingboard 10, it can be seen that the swingboard 10 comprises two sheets 30 and 32 which are molded in a predetermined manner and fused to one another to define a unitary member 34 having its longitudinal ends enclosed in a manner to be described hereinafter. A method which may be employed in the manufacture of the unitary member 34 defining the plastic sheets 30 and 32 is disclosed in U.S. Pat. No. 3,783,084, and further reference to the specific manner of which such an article may be formed is defined therein. It should suffice to say that the unitary piece 34 is formed by having the two plastic sheets 30 and 32 simultaneously heated for individually selected, timed durations and at individually selected temperatures in an apparatus of the type disclosed in the aforementioned U.S. Pat. No. 3,783,078. The sheets of plastic material 30 and 32 are clamped to the vacuum-forming apparatus of the aforementioned patent, and the sheets are heated in separate heating means. The sheets are transferred from the heating means and positioned between a pair of vacuum mold sections whereupon a differential pressure is applied to the surface of the sheets such that each heated sheet is formed to the shape of its mold section to form the contour, as illustrated in the cross section of FIG. 6 of the drawings. The molded sheets are then pressed together and fused at the abutting surfaces and, in particular, are fused along the edges 35 of the sheets.

Figure 6:
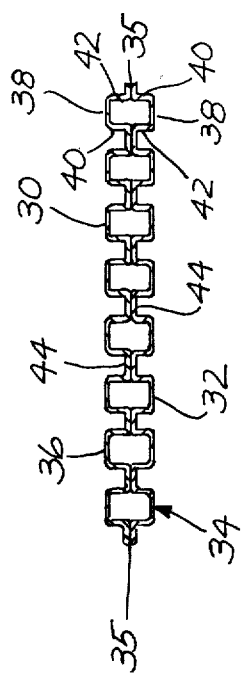
FIG. 6 is a transverse, cross-sectional view taken along Line 6—6 of FIG. 2.

As can best be seen in FIG. 6 of the drawings, each of the sheets 30 and 32 is formed with a plurality of longitudinally disposed, laterally spaced, and outwardly projecting ribs 36. Each rib 36 has a U-shaped cross section with an outwardly disposed base 38 and depending side walls 40 and 42. The side walls 40 and 42 are respectively connected to adjacent side walls 40 and 42 by means of web members 44, which similarly extend the longitudinal length of the unitary member 34. It can be seen from FIG. 6 that when the plastic sheets 30 and 32 are molded into the aforementioned shape and brought together with their outer edges 35 being fused together, the vertical walls 40 and 42 of each rib 36 of one sheet become laterally aligned with the corresponding walls 40 and 42 of the adjacent plastic sheet, while the web members 44 are brought into an abutting, supporting relationship.

Figure 5:
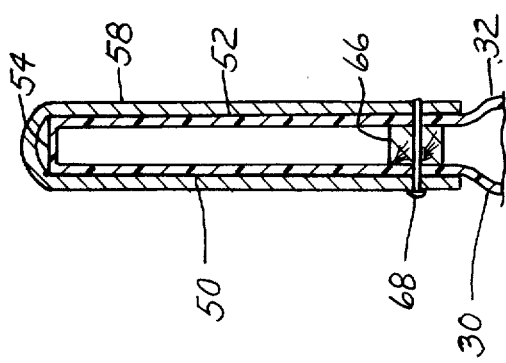
FIG. 5 is an enlarged, fragmentary, longitudinal, cross-sectional view taken along Line 5—5 of FIG. 4.

As can be seen in FIG. 5 of the drawings, the longitudinal ends of the unitary member sheets 30 and 32 are respectively provided with flat flanges 50 and 52 which are fused at their ends 54. As can be seen throughout the several views, the opposite ends of the unitary member 34 are enclosed by U-shaped, metal reinforcement members 56 and 58. As can best be seen in FIG. 2, the rear surface of the reinforcement members 56 and 58 are apertured at 60 to define a predetermined configuration which is adapted to mate with and receive a suitable attaching means carried by the belt rails of the freight compartment so as to provide a simple and conventional means for attaching the swingboard 10 to the freight compartment walls, as described hereinbefore. Prior to the attachment of the reinforcement members 56 and 58 to the opposite, longitudinal ends of the unitary member 34, the opposite ends of the unitary member 34 are cut to remove a rectangular section from the joined flanges 50 and 52, as shown in FIG. 2 in phantom lines at 62 and 64. After the sections 62 and 64 have been removed from the unitary piece 34, a wooden member 66 (FIG. 5) is inserted between the opposing inner surfaces of the flanges 50 and 52 at a position adjacent the termination of the ribs 36. The wooden member 66 extends the full width of the unitary member 34. The reinforcement members 56 and 58 are then inserted on the opposite ends of the unitary member 34 and suitable fastening means, such as rivets 68, extend through aligned apertures in the ends of the reinforcement members 56 and 58, the flanges 50 and 52, and the wooden member 66, as illustrated in FIG. 5. The plurality of rivets 68 securely attach the reinforcement members 56 and 58 to the unitary member 34. Wooden member 66 provides the dual function of providing the proper spacing between the interior surfaces of the flanges 50 and 52 while also providing for adequate support between the members so as to insure a secure, strong and reliable connection between the unitary member 34 and the reinforcement members 56 and 58. In the preferred embodiment the sheets of material 30 and 32 are fabricated from a heat-fusible sheet of organic, plastic material having sufficient strength to withstand the forces which such swingboards are accustomed to supporting.

It can thus be seen that the present invention has provided a new and improved swingboard which is of a unique construction but simple of design and, thus, inexpensive to fabricate.

It should be understood by those skilled in the art of swingboards that while only one form of applicant's invention has been disclosed, other forms may be had, all coming within the spirit of the invention and scope of the appended claims.

What is claimed is as follows:

1. A swingboard comprising:
    a first sheet of plastic material having a plurality of longitudinally disposed and laterally spaced ribs, each rib having a U-shaped configuration including an outwardly projecting base and upright walls, the walls of adjacent ribs being connected by an integral web;
    a second sheet of plastic material having a plurality of longitudinally disposed and laterally spaced ribs, each rib of said second sheet having a U-shaped configuration and including an outwardly projecting base and upright walls, the adjacent walls of said last-mentioned adjacent ribs being connected by a second integral web, said first and second sheets of material being joined in an abutting relationship such that the rib bases on each sheet project outwardly on opposite sides of said joined sheets and said first and second sheet webs inner opposing surfaces are in abutment and the upright walls of said ribs of one sheet are in alignment with adjacent, opposing upright walls of the other sheet;
    flange members extending from the longitudinal ends of said joined sheets, each of said flange members being fused to each other and having a cut-out portion to permit access to the interior of said fused flange members, said longitudinal ribs terminating at a location adjacent said flanges;

a structural support member located between opposed inner surfaces of said flanges;
a U-shaped metal member encompassing the outside of said flanges; and
fastening means extending through said U-shaped member, said flanges and said structural support member to secure said joined sheets to said U-shaped metal member, each of said U-shaped end members having apertures corresponding to said cut-out portion.

* * * * *